United States Patent [19]

Philbeck et al.

[11] Patent Number: 4,936,368
[45] Date of Patent: Jun. 26, 1990

[54] WINDOW SCREEN FOR PICK-UP TRUCK

[76] Inventors: Carey P. Philbeck, P.O. Box 3152, Newport News, Va. 23603; Marlon D. Beahm, 2909 Richard Pace N., Williamsburg, Va. 23185

[21] Appl. No.: 354,760

[22] Filed: May 22, 1989

[51] Int. Cl.5 .................................................. E06B 3/00
[52] U.S. Cl. ........................................ 160/90; 160/105
[58] Field of Search ....................... 160/105, 90, 370.2, 160/371; 98/2.12

[56] References Cited

U.S. PATENT DOCUMENTS

| | | | |
|---|---|---|---|
| 2,568,800 | 9/1951 | Galla | 160/105 |
| 2,625,217 | 1/1953 | Spiller et al. | 160/105 X |
| 2,776,709 | 1/1957 | Lawlor | 160/105 |
| 2,805,712 | 9/1957 | McVicker | 160/105 X |
| 2,881,831 | 4/1959 | Knodel, Jr. | 160/105 |
| 2,997,103 | 8/1961 | Buchanan | 160/105 X |
| 3,016,952 | 1/1962 | Shero | 160/105 |
| 3,422,876 | 1/1989 | Fester | 160/105 X |
| 4,139,233 | 2/1979 | Blott | |
| 4,398,586 | 8/1983 | Hall | 160/105 |

Primary Examiner—Blair M. Johnson

[57] ABSTRACT

An add-on window screen installable on the rear window of a pick-up truck to prevent flying insects and debris from entering the cab area of the truck through the rear window. The screen frame is engageable with pre-existing sealing strips on the window system, such that the screen is firmly located within the window opening without screws or other attachment devices. The window system does not have to be modified in any way in order to mount the add-on screen in the window opening.

1 Claim, 1 Drawing Sheet

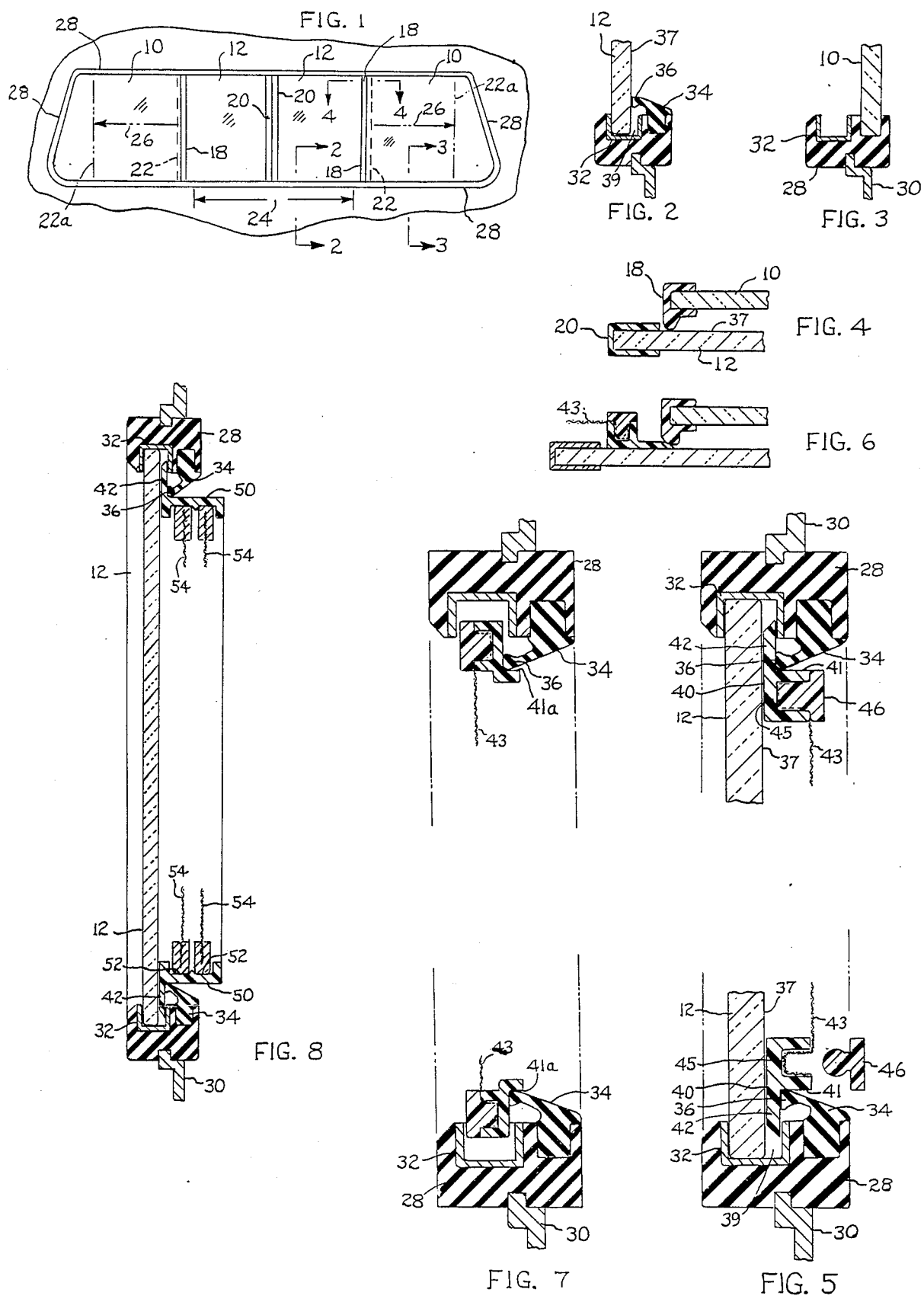

WINDOW SCREEN FOR PICK-UP TRUCK

BACKGROUND AND SUMMARY OF THE INVENTION

Some current pick-up trucks include cabs that are equipped with openable rear windows. Commonly such rear windows comprise two stationary window panes spaced laterally apart to define a central window opening.

Upper and lower tracks extend along the window opening and the stationary panes for slidably supporting two movable panes. These movable window panes are slidably arranged on the tracks for movement between closed positions spanning the central window opening, and open positions extending in near adjacency to the stationary panes.

When the pick-up truck is moving, with the rear window opened, air can circulate between the truck cab and the cargo area directly behind the window. In some cases such air circulation can cause debris to be carried from the cargo area through the rear window into the cab.

The present invention relates to an add-on window screen that can be installed in the cab rear window to permit air circulation into or out of the cab, while preventing cargo debris from moving through the window opening. The principal aim of the invention is to provide a window screen that can be installed on existing vehicles without modification of the vehicle structure. In preferred practice of the invention the add-on screen is removably attached to the vehicle by manual manipulation of the screen structure; no screws, adhesives or similar attachment mechanisms are used or required.

THE DRAWINGS

FIG. 1 is an exterior view of a rear window on a conventional pick-up truck.

FIGS. 2, 3 and 4 are enlarged fragmentary sectional views taken respectively on lines 2—2, 3—3 and 4—4 in FIG. 1.

FIG. 5 is a view taken in the same direction as FIG. 2, with a window screen of the present invention installed thereon.

FIG. 6 is a view taken in the same direction as FIG. 4, with the FIG. 5 window screen installed on the existing vehicle rear window.

FIG. 7 is a view taken in the same direction as FIG. 5, but showing another form of the invention.

FIG. 8 is a view in the same direction as FIG. 5, showing still another form that the invention can take.

DESCRIPTION OF A PREFERRED EMBODIMENT OF THE INVENTION

FIG. 1 is an exterior elevational view of a conventional window construction built into the rear wall of the cab portion of a pick-up truck. The window structure includes two fixed panes 10, 10 spaced apart to form a central window opening. Two movable panes 12, 12 are slidably mounted in upper and lower tracks for movements between closed positions spanning the central opening, and open positions overlapping the fixed panes 10, 10. FIG. 1 shows movable panes 12, 12 in their closed positions in the central opening.

Numerals 18 reference rigid upstanding channels secured to the inner edges of fixed panes 10, 10. Movable panes 12, 12 move across fixed channels 18 and along inner (front) side surfaces of panes 10, 10. Each pane 12 has a sealing strip 20 extending along its inner upstanding edge; FIG. 4 shows strip 20 as having a channel cross-section. When panes 12 are in their closed positions (as shown in FIG. 1) the two sealing strips 20 meet to seal the joint between the pane edges A manually-actuable latch means, not shown, is carried on strips 20 to releasably retain panes 12 in their closed positions.

Numerals 22 reference the outer side edges of panes 12. When panes 12 are manually moved fully apart, pane edges 22 assume positions indicated by numerals 22a; numerals 26 indicate the stroke distances for the individual panes. The spread-apart panes 12 will then define a window opening having a lateral dimension 24.

FIG. 3 illustrates some details of a representative mounting structure for fixed panes 10. The lower edge of each pane 10 is fixedly seated within a groove in an elastomeric molding 28 that is carried on the cab rear wall 30. Molding 28 extends entirely around the perimeter of the window structure, so that the upper edge and outer side edge of each fixed pan 10 is seated within a different section of the illustrated groove in molding 28

Molding 28 is horizontally thickened to support upper and lower guide tracks for movable panes 12,12; FIG. 3 shows a lower guide track 32 having a channel cross-section. The upper guide track, not shown, has a similar cross-section. FIG. 2 shows the lower edge area of a movable pane 12 located within track 32; the upper edge of each pane 12 would be similarly located within the upper track, not shown. Each movable pane 12 is movable through a stroke distance 26 (FIG. 1). Each track 32 has a sufficient length to accommodate the desired stroke distances; opposite ends of each track 32 would be approximately at references points 22a (FIG. 1).

Each guide track 32 has an elastomeric sealing strip 34 associated therewith. Each strip 34 has a free edge 36 projecting upwardly (or downwardly) from the horizontal profile of the associated track 32 so as to sealably engage outer face 37 of the associated movable pane 12. As shown in FIG. 2, free edge 36 of strip 34 extends upwardly above the horizontal profile of track 32. In the case of the upper track, not shown, the free edge of the sealing strip would project downwardly below the horizontal profile of the associated track. Each sealing strip 34 has a longitudinal length sufficient to enable it to extend the entire distance between upstanding channels 18 (FIG. 1).

It will be seen from FIG. 2 that a small clearance space 39 exists between movable pane 12 and the internal side surface of track 32. This clearance space can be used for installation of add-on window screens constructed according to this invention. As shown in FIG. 5, an add-on window screen of the invention comprises a frame that includes rails 40 positioned against face 37 of pane 12. The outer perimeter edge areas of the illustrated rails 40 comprise relatively thin strip sections 42 adapted to extend into clearance spaces 39.

The window screen frame is a hollow four-sided rectangular frame, wherein each side (rail) has the cross section shown in FIG. 5. The four side rails 40 have laterally extending channel sections 45 adapted to receive edge areas of a foraminous screen 43; an elongated clamp strip 45 has a protruding bulbous section adapted to extend into the channel in rail 40, so as to retain the foraminous screen in place on rails 40. A similar strip 45 is employed on (along) each of the four rails 40.

Channel section 45 on rail 40 forms an external shoulder 41 adapted to engage edge 36 of sealing strip 34. Sealing strip 34 is deformable (bendable) toward or away from track 32 to permit a variation in the vertical free space available between the upper and lower sealing strips for receiving the screen frame.

The add-on screen will have a height dimension slightly less than the vertical spacing between the bottom interior surface of lower track 32 and the mouth surface of upper track 32. The width dimension of the add-on screen will be the same as or slightly greater than the lateral spacing between stationary channels 18, 18. FIG. 6 shows one of the side rails 40 having its edge strip 42 extending behind the associated channel 18.

Installation of the add-on screen can be carried out with panes 12, 12 closed, as shown in FIG. 1, or substantially open, as shown in FIG. 6. With panes 12, 12 closed, sealing strip edges 36 can be pried away from surfaces 37 of panes 12 to permit rail strip edges 42 to be inserted part way into the associated channel tracks 32. The height dimension of the screen frame is selected so that the frame can be moved down and then up so as to fit between the upper and lower sealing strips 34, with strip edge areas 42 extending partway into guides 32; sealing strips 34 are deformable toward guide 32 to temporarily expand the vertical free space for accommodating the screen frame. In the installed position of the screen external shoulders 41 of the upper and lower rails engage edges 36 of sealing strips 34, with edge strips 42 extending partway into clearance spaces 39.

Panes 12 can be manually moved along tracks 32, even though rails 40 have rubbing engagement with pane faces 37. Rails 40 are preferably formed of a rigid plastic material that permits the desired pane movement without excessive noise, wear or frictional resistance. The add-on screen can be removed from the window opening without tools or damage to the window structure.

FIG. 7 shows another form of the invention wherein the movable panes 12 must be shifted to their opened positions before installation of the screen. The screen occupies the central space designated by numeral 24 in FIG. 1.

The FIG. 7 screen frame is constructed generally similar to the FIG. 5 screen frame, except that it does not have the thin perimeter edge strips 42 shown in FIG. 5. The upper and lower screen frame rails extend partway into tracks 32. External shoulders 41a on the upper and lower rails will engage the free edges 36 of sealing strips 34. The height dimension of the add-on screen is selected to permit insertion of the screen into tracks 32. Sealing strips 34 position the screen in the FIG. 7 location.

FIG. 8 illustrates another form that the invention can take. The side rails of the add-on screen have thin perimeter edge strip sections 42 similar to sections 42 shown in FIG. 5. Accordingly the screen unit is installed and positioned as described in connection with FIG. 5.

The FIG. 8 rails include flanges 50 extending normal to the window opening to define trackways 52. Two overlapping foraminous panels 54 are slidably supported on said trackways for movement between open and closed positions. The FIG. 8 system permits window panes 12, 12 to be opened and closed; additionally the foraminous screen units 54 can be opened or closed.

The various forms of the invention are adapted for relatively easy installation on the rear windows of conventional pick-up trucks without need for drilling holes in the cab wall or otherwise modifying the window structure.

What is claimed is:

1. In combination with the rear window of a pick-up truck, wherein said window comprises two stationary window panes spaced laterally apart to define a central window opening; upper and lower tracks having interior guide surfaces and extending along the window opening and sections of the stationary panes; two movable window panes having upper and lower edges slidably arranged in said tracks for movement between closed positions spanning the window opening, and open positions extending in near adjacency to the stationary panes; and deformable sealing strips extending along each track to sealably engage the exterior surfaces of the movable window panes, each sealing strip having a free edge projecting beyond the profile of the associate track into the window opening, the improvement comprising: an add-on screen installable in the defined window opening, said screen comprising a rectangular frame having upper and lower rails, said rails having edge portions adapted to extend within the tracks, and shoulder portions engageable with the free edges of the sealing strips; said rectangular frame being formed of a rigid plastic material; said frame rails having rectangular cross-sectioned channel sections (45) adapted to receive edge portions of a foraminous screen material, and a clamp strip (46) insertable into the channel sections to grip the screen material; each frame rail having said shoulder portion comprising an external flat shoulder (41) extending therealong normal to the general plane of the rectangular frame for seating on the free edge of an associated deformable sealing strip; each frame rail further including said edge portion comprising a relatively thin flat strip section (42) extending therealong which is disposed within clearance space between the associated window pane and track interior guide surface; each flat strip section extending normal to the associated flat shoulder; the defined rectangular frame having a flat side surface paralleling the plane of the frame to extend along the exterior faces of the movable window panes.

* * * * *